US010295429B2

(12) United States Patent
Ueda et al.

(10) Patent No.: US 10,295,429 B2
(45) Date of Patent: May 21, 2019

(54) TIRE BALANCE MEASUREMENT DEVICE, EVALUATION METHOD OF TIRE BALANCE MEASUREMENT DEVICE, CALIBRATION METHOD OF TIRE BALANCE MEASUREMENT DEVICE, AND CALIBRATION PROGRAM OF TIRE BALANCE MEASUREMENT DEVICE

(71) Applicant: MITSUBISHI HEAVY INDUSTRIES MACHINERY SYSTEMS, LTD., Hyogo (JP)

(72) Inventors: Tatsuya Ueda, Hiroshima (JP); Takumi Tsumura, Hiroshima (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 15/546,785

(22) PCT Filed: Aug. 24, 2016

(86) PCT No.: PCT/JP2016/074631
§ 371 (c)(1),
(2) Date: Jul. 27, 2017

(87) PCT Pub. No.: WO2018/037494
PCT Pub. Date: Mar. 1, 2018

(65) Prior Publication Data
US 2018/0172541 A1 Jun. 21, 2018

(51) Int. Cl.
*G01M 1/16* (2006.01)
(52) U.S. Cl.
CPC ..................... *G01M 1/16* (2013.01)

(58) Field of Classification Search
CPC ........................................................ G01M 1/16
See application file for complete search history.

(56) References Cited

U.S. PATENT DOCUMENTS 6,044,334 A * 3/2000 Joe ........................... G01M 1/22
702/147
2003/0213302 A1 11/2003 Miura
2007/0183694 A1* 8/2007 Ogimoto ............... G01M 13/04
384/100

FOREIGN PATENT DOCUMENTS

JP 57-144442 A 9/1982
JP 3429346 B2 7/2003
(Continued)

OTHER PUBLICATIONS

International Search Report in International application No. PCT/JP2016/074631, dated Nov. 22, 2016. 2pp.
(Continued)

*Primary Examiner* — Francis C Gray
(74) *Attorney, Agent, or Firm* — Kanesaka Berner and Partners, LLP (57) ABSTRACT

A tire balance measurement device includes a rotation drive portion, an eccentric force measurement unit, a calculation unit, and an evaluation unit. The eccentric force measurement unit measures an eccentric force generated in a main shaft. The calculation unit calculates an eccentric amount of the main shaft based on the eccentric force measured by the eccentric force measurement unit. The evaluation unit evaluates the eccentric amount of the main shaft based on a correlation between the eccentric force measured by the eccentric force measurement unit when the main shaft is rotated at a predetermined rotation speed, and the rotation speed.

6 Claims, 7 Drawing Sheets

(56) References Cited

FOREIGN PATENT DOCUMENTS

| JP | 4119302 B2 | | 7/2008 | | |
|---|---|---|---|---|---|
| JP | 2012-247351 A | | 12/2012 | | |
| JP | 2012247351 A | * | 12/2012 | .............. | G01M 1/16 |
| JP | 2012247351 A | * | 12/2012 | .............. | G01M 1/16 |
| JP | 2013221792 A | * | 10/2013 | .............. | G01M 1/16 |
| JP | WO 2013154161 A1 | * | 10/2013 | .............. | G01M 1/16 |
| JP | 5904851 B2 | | 4/2016 | | |

OTHER PUBLICATIONS

Written Opinion of the International Searching Authority in International patent application No. PCT/JP2016/074631, dated Nov. 22, 2016. 7pp.

* cited by examiner

TIRE BALANCE MEASUREMENT DEVICE, EVALUATION METHOD OF TIRE BALANCE MEASUREMENT DEVICE, CALIBRATION METHOD OF TIRE BALANCE MEASUREMENT DEVICE, AND CALIBRATION PROGRAM OF TIRE BALANCE MEASUREMENT DEVICE

RELATED APPLICATIONS

The present application is a National Phase of International Application Number PCT/JP2016/074631 filed Aug. 24, 2016.

TECHNICAL FIELD

The present invention relates to a tire balance measurement device, an evaluation method of a tire balance measurement device, a calibration method of a tire balance measurement device, and a calibration program of a tire balance measurement device.

BACKGROUND ART

In a manufacturing process of a tire, various inspections are performed on a manufactured tire for quality control. As one of the inspections, a dynamic balance when the tire is rotated (hereinafter, referred to as a dynamic balance) is measured.

A tire balance measurement device which inspects the dynamic balance of a tire includes a lower rim and an upper rim which interposes a tire therebetween, a main shaft which is integrally provided with the lower rim, a rotation drive mechanism which rotationally drives the main shaft, and an eccentric amount detection sensor which detects an eccentric amount generated in the main shaft. The tire balance measurement device rotates the main shaft by the rotation drive mechanism in a state where the tire interposed between the lower rim and the upper rim is filled with air. The tire interposed between the lower rim and the upper rim integrally rotates with the main shaft by the rotation of the main shaft. The tire balance measurement device detects the eccentric amount generated in the main shaft when the tire is rotated, and thereby, measures the dynamic balance (unbalance amount) of the tire.

In the tire balance measurement device, in order to secure measurement accuracy, it is necessary to calibrate a balance of the lower rim, the upper rim, and the main shaft. PTL 1 discloses a calibration method of a tire balance measurement device using a sinker whose weight is known. In this method, in each of a case where the sinker is mounted on only the lower rim, a case where the sinker is mounted on only the upper rim, a case where the sinker is mounted on the lower rim and the upper rim, and a case where the sinker is not mounted, the lower rim, the upper rim, and the main shaft are rotated and an eccentric force of the main shaft is detected. The tire balance measurement device is calibrated from a measurement result of the eccentric force when the sinkers whose weights are known are mounted and the lower rim, the upper rim, and the main shaft are rotated.

CITATION LIST

Patent Literature

[PTL 1] Japanese Patent No. 3429346

SUMMARY OF INVENTION

Technical Problem

However, as disclosed in PTL 1, in order to perform the calibration of the tire balance measurement device using the sinker, it is necessary to stop manufacturing of a tire and attach and detach the sinker with respect to the lower rim or the upper rim, which requires time and effort. Accordingly, if the calibration of the tire balance measurement device is performed periodically, production efficiency of a manufacturing process of a tire decreases.

An object of the present invention is to provide a tire balance measurement device, an evaluation method of a tire balance measurement device, a calibration method of a tire balance measurement device, and a calibration program of a tire balance measurement device capable of easily performing calibration of the tire balance measurement device periodically, preventing a decrease in production efficiency of a manufacturing process of a tire, and performing a quality control with higher accuracy.

Solution to Problem

According to a first aspect of the present invention, there is provided a tire balance measurement device including: a rotation drive portion; an eccentric force measurement unit; a calculation unit; and an evaluation unit. The rotation drive portion rotates a main shaft which supports at least one of a pair of rims which can interpose a tire therebetween. The eccentric force measurement unit measures an eccentric force generated in the main shaft when the main shaft which supports at least one of the pair of rims is rotated. The calculation unit calculates an eccentric amount of the main shaft based on the eccentric amount measured by the eccentric force measurement unit. The evaluation unit evaluates the eccentric amount of the main shaft based on a correlation between the eccentric amount calculated by the calculation unit based on the eccentric force measured when the main shaft is rotated at a predetermined rotation speed by the rotation drive portion, and the rotation speed.

According to this configuration, if the tire is rotated along with the main shaft by the rotation drive portion in a state where the tire is interposed between the pair of rims and the eccentric force of the main shaft is measured by the eccentric force measurement unit, it is possible to obtain an unbalance amount of the tire by the calculation unit.

In addition, if the main shaft which supports at least one of the pair of rims is rotated by the rotation drive portion in a state where the tire is not interposed between the pair of rims and the eccentric force of the main shaft is measured by the eccentric force measurement unit, it is possible to obtain the eccentric amount of the main shaft itself by the calculation unit. For example, in a case where the eccentric amount of the main shaft itself is changed due to some reasons including a change of temperatures or the like, if the main shaft is rotated at the same rotation speed before and after the change of the eccentric amounts occurs, it is possible to easily ascertain the change. Accordingly, in the evaluation unit, by evaluating the eccentric amount of the main shaft based on the correlation between the eccentric amount calculated by the calculation unit when the main shaft is rotated at the predetermined rotation speed by the rotation drive portion and the rotation speed, it is possible to ascertain whether or not the change of the eccentric amounts of the main shaft is generated.

In this way, it is possible to ascertain the change of the eccentric amounts of the main shaft without mounting a sinker on the main shaft. Accordingly, it is possible to easily check the eccentric amount of the main shaft in a short time.

According to a second aspect of the present invention, the tire balance measurement device of the first aspect may further include a correction unit which corrects Calculation Expression used in a calculation by the calculation unit based on an evaluation result of the eccentric amount by the evaluation unit.

Accordingly, in a case where the eccentric amount of the main shaft is changed, it is possible to calibrate the tire balance measurement device by correcting Calculation Expression which is used in the calculation by the calculation unit using the correction unit.

According to a third aspect of the present invention, the evaluation unit of the first or second aspect may evaluate the eccentric amount of the main shaft based on a correlation between the eccentric amount calculated by the calculation unit based on the eccentric force measured when the main shaft is rotated at each rotation speed by rotating the main shaft at a plurality of rotation speeds different from each other, and the rotation speed.

If the rotation speed of the main shaft increases, a centrifugal force generated in the main shaft increases, and the eccentric amount generated due to unbalance of the main shaft also increases. Accordingly, if the main shaft is rotated at the plurality of rotation speeds different from each other and the eccentric force is measured at each of the rotation speeds, it is possible to evaluate the change of the eccentric amounts of the main shaft with higher accuracy.

According to a fourth aspect of the present invention, there is provided an evaluation method of a tire balance measurement device, in which the tire balance measurement device includes a pair of rims which interposes a tire therebetween and a rotation drive portion which rotates the pair of rims. The tire balance measurement device further includes an eccentric force measurement unit and a calculation unit. The eccentric force measurement unit measures an eccentric force generated in a main shaft when the main shaft which supports at least one of the pair of rims is rotated. The calculation unit calculates an eccentric amount of the main shaft based on the eccentric amount measured by the eccentric force measurement unit. The evaluation method of a tire balance measurement device includes a step of evaluating the eccentric amount of the main shaft based on a correlation between the eccentric amount calculated by the calculation unit based on the eccentric force measured when the main shaft is rotated at a predetermined rotation speed by the rotation drive portion, and the rotation speed.

By using the evaluation method of a tire balance measurement device, it is possible to ascertain the change of the eccentric amounts of the main shaft itself of the tire balance measurement device without mounting a sinker on the main shaft. Accordingly, it is possible to easily check the eccentric amount of the main shaft in a short time.

According to a fifth aspect of the present invention, there is provided a calibration method of a tire balance measurement device, in which the tire balance measurement device includes a pair of rims which interposes a tire therebetween and a rotation drive portion which rotates the pair of rims. The tire balance measurement device further includes an eccentric force measurement unit and a calculation unit. The eccentric force measurement unit measures an eccentric force generated in a main shaft when the main shaft which supports at least one of the pair of rims is rotated. The calculation unit calculates an eccentric amount of the main shaft based on the eccentric amount measured by the eccentric force measurement unit. The calibration method of a tire balance measurement device includes a step of evaluating the eccentric amount of the main shaft based on a correlation between the eccentric amount calculated by the calculation unit based on the eccentric force measured when the main shaft is rotated at a predetermined rotation speed by the rotation drive portion, and the rotation speed. The calibration method of a tire balance measurement device further includes a step of correcting Calculation Expression used in a calculation by the calculation unit based on an evaluation result of the eccentric amount by the step of evaluating the eccentric amount of the main shaft.

By using the calibration method of a tire balance measurement device, in a case where the eccentric amount of the main shaft of the tire balance measurement device is changed, it is possible to calibrate the tire balance measurement device by correcting Calculation Expression which is used in the calculation by the calculation unit using the correction unit.

According to a sixth aspect of the present invention, there is provided a calibration program of a tire balance measurement device, in which the tire balance measurement device includes a pair of rims which interposes a tire therebetween, and a rotation drive portion which rotates the pair of rims. The tire balance measurement device further includes an eccentric force measurement unit and a calculation unit. The eccentric force measurement unit measures an eccentric force generated in a main shaft when the main shaft which supports at least one of the pair of rims is rotated. The calculation unit calculates an eccentric amount of the main shaft based on the eccentric amount measured by the eccentric force measurement unit. The calibration program of the tire balance measurement device includes processing of evaluating the eccentric amount of the main shaft based on a correlation between the eccentric amount calculated by the calculation unit based on the eccentric force measured when the main shaft is rotated at a predetermined rotation speed by the rotation drive portion, and the rotation speed. The calibration program of the tire balance measurement device further includes processing of correcting Calculation Expression used in a calculation by the calculation unit based on an evaluation result of the eccentric amount by the processing of evaluating the eccentric amount of the main shaft.

Since the calibration program of the tire balance measurement device is introduced to the tire balance measurement device, in a case where the eccentric amount of the main shaft of the tire balance measurement device is changed, it is possible to calibrate the tire balance measurement device by correcting Calculation Expression which is used in the calculation by the calculation unit using the correction unit.

Advantageous Effects of Invention

According to the above-described tire balance measurement device, evaluation method of a tire balance measurement device, calibration method of a tire balance measurement device, and calibration program of the tire balance measurement device, the tire balance measurement device is easily calibrated, a decrease in the production efficiency of the manufacturing process of the tire is prevented, and it is possible to perform quality control with higher accuracy.

DESCRIPTION OF EMBODIMENTS

Figure 1:
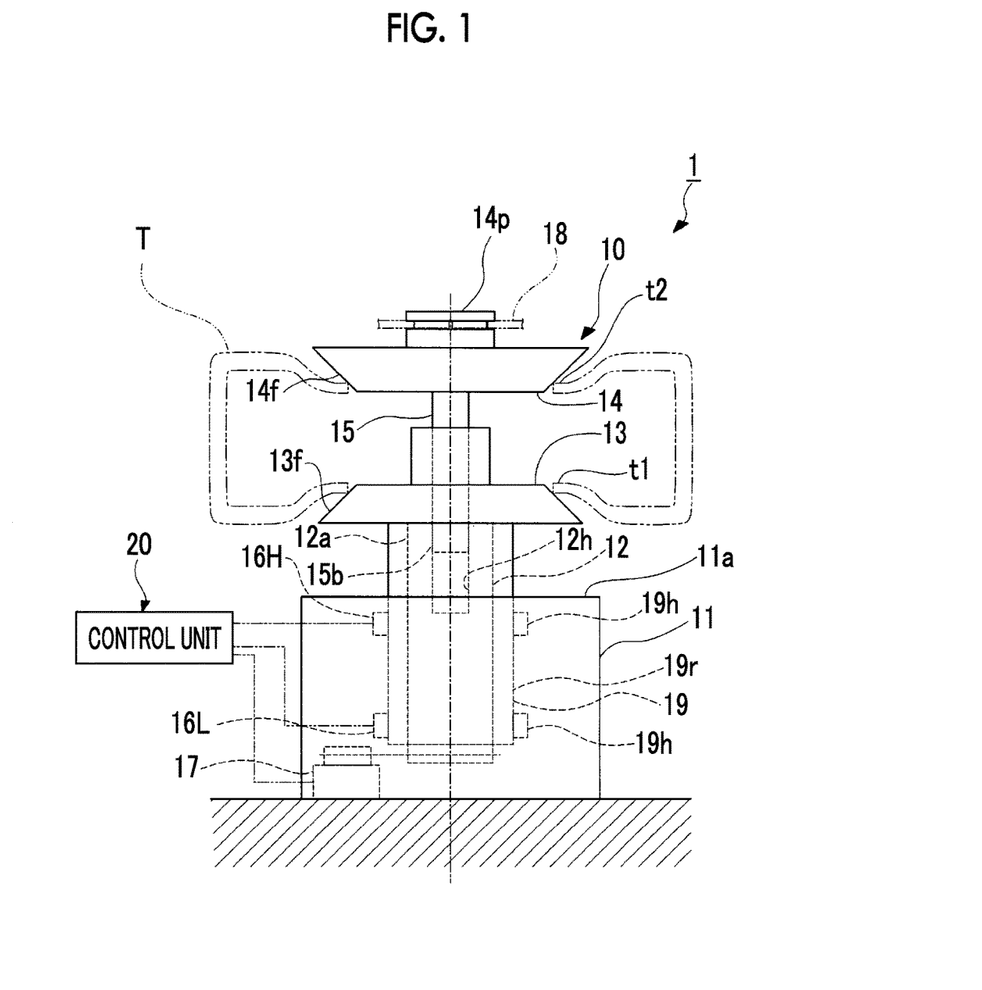
FIG. 1 is an elevation view showing a schematic configuration of a tire balance measurement device in an embodiment of the present invention.
Figure 2:
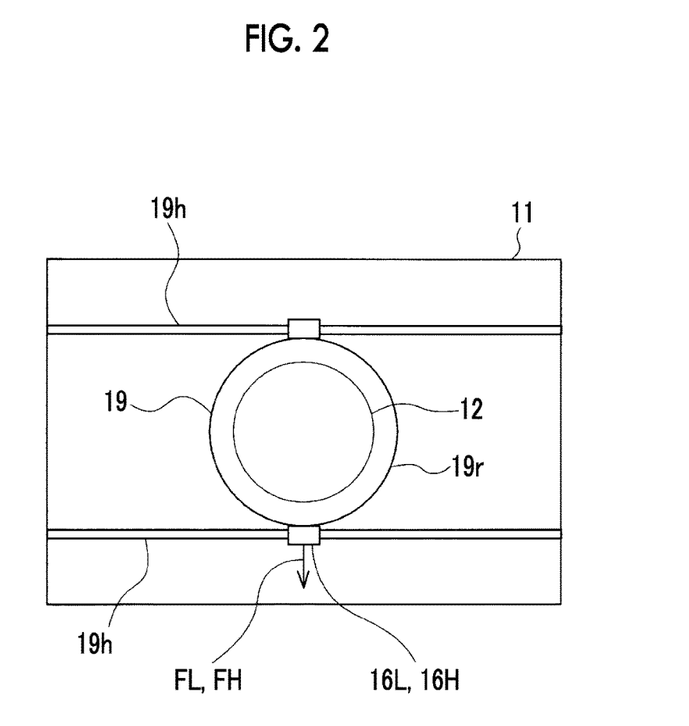
FIG. 2 is a flat sectional view showing a load cell which detects an eccentric force of a main shaft of the tire balance measurement device in the embodiment of the present invention.

FIG. 1 is an elevation view showing schematic configuration of a tire balance measurement device in an embodiment of the present invention. FIG. 2 is a flat sectional view showing a load cell which detects an eccentric force of a main shaft of the tire balance measurement device in the embodiment of the present invention.

As shown in FIG. 1, a tire balance measurement device 1 includes a device main body 10 and a control unit 20.

The device main body 10 includes a base 11, a main shaft 12, a lower rim 13, an upper rim 14, a shaft 15, and load cells (eccentric force measurement units) 16L and 16H.

The base 11 is installed on a floor surface.

The main shaft 12 extends in a vertical direction and is supported to the base 11 via a main shaft support member 19. The main shaft support member 19 is attached to the base 11 via attachment members 19h. The main shaft support member 19 is formed in a cylindrical shape and the main shaft 12 is rotatably supported inside the main shaft support member 19.

The main shaft 12 is rotationally driven around a center axis thereof by a rotation drive portion 17 such as a motor provided in the base 11. An upper end portion 12a of the main shaft 12 protrudes vertically upward from an upper surface 11a of the base 11.

The lower rim 13 is integrally fixed to the upper end portion 12a of the main shaft 12 and rotates along with the main shaft 12. A rim contact surface 13f, which comes into close contact with the inner peripheral portion of the tire T from below, is formed on the lower rim 13.

The upper rim 14 is disposed so as to face the lower rim 13 with a gap therebetween vertically. A rim contact surface 14f, which comes into close contact with the inner peripheral portion of the tire T from above, is formed on the upper rim 14.

The shaft 15 extending downward is integrally provided on the upper rim 14. A lower end portion 15b of the shaft 15 is inserted into an insertion hole 12h formed in the main shaft 12 and is provided to be lifted and lowered in a vertical direction with respect to the main shaft 12. A held portion 14p for holding the upper rim 14 and the shaft 15 is provided on the upper rim 14. The held portion 14p can be held by a chuck member 18 of a lifting/lowering device (not shown), and the upper rim 14 and the shaft 15 are lifted and lowered vertically by the lifting/lowering device (not shown). Accordingly, the upper rim 14 can move close to or away from the lower rim 13.

As shown in FIGS. 1 and 2, the load cells 16L and 16H are provided so as to be in contact with the outer peripheral surface 19r of the main shaft support member 19 inside the base 11. The load cells 16L and 16H detect an eccentric force (a force in a radial direction orthogonal to the center axis of the main shaft 12) generated in the main shaft 12 via the main shaft support member 19. The load cells 16L and 16H are disposed at two locations positioned with a gap therebetween in the vertical direction in the base 11.

Figure 3:
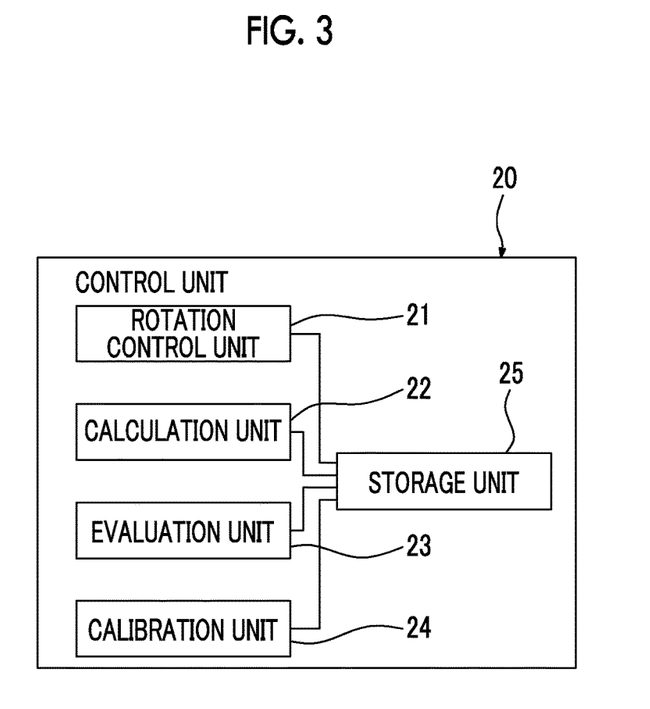
FIG. 3 is a block diagram showing a configuration of a control unit of the tire balance measurement device in the embodiment of the present invention.

FIG. 3 is a block diagram showing a configuration of a control unit of the tire balance measurement device in the embodiment of the present invention.

As shown in FIG. 3, the control unit 20 includes a rotation control unit 21, a calculation unit 22, an evaluation unit 23, a calibration unit (correction unit) 24, and a storage unit 25.

The rotation control unit 21 controls the operation of the rotation drive portion 17 and adjusts the rotation speed of the main shaft 12.

The calculation unit 22 calculates an eccentric amount based on signals of eccentric forces detected by the load cells 16L and 16H. In the present embodiment, the calculation unit 22 can calculate an unbalance amount of the tire T held between the lower rim 13 and the upper rim 14 and the eccentric amount of the main shaft 12.

The evaluation unit 23 evaluates an unbalance amount of the tire T and an eccentric amount of the main shaft 12 based on the unbalance amount and the eccentric amount of the main shaft 12 calculated by the calculation unit 22.

In a case where the eccentric amount of the main shaft 12 in the evaluation unit 23 deviates from a predetermined reference, the calibration unit 24 performs calibration processing described in detail later.

The storage unit 25 stores the unbalance amount or the eccentric amount calculated by the calculation unit 22, an evaluation result in the evaluation unit 23, or the like.

(Measurement Processing of Unbalance Amount of Tire T)

Figure 4:
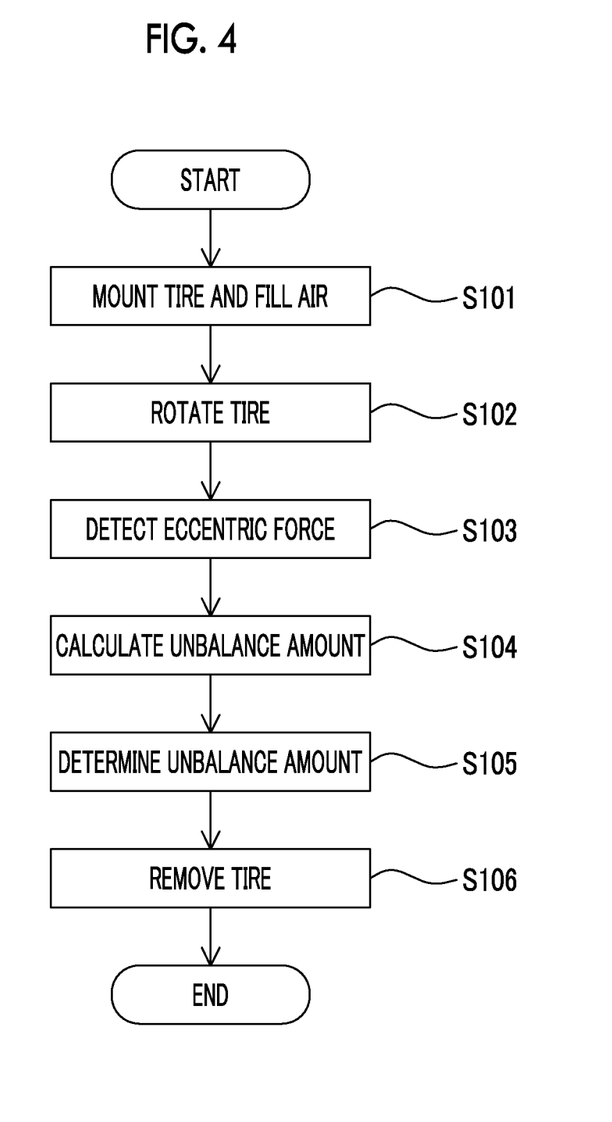
FIG. 4 is a flowchart showing a flow of measurement processing of an unbalance amount of a tire in the tire balance measurement device of the embodiment of the present invention.

FIG. 4 is a flowchart showing a flow of measurement processing of the unbalance amount of the tire in the tire balance measurement device of the embodiment of the present invention.

The tire balance measurement device 1 measures the unbalance amount of the tire T in a state where the tire T is interposed between the lower rim 13 and the upper rim 14.

For this purpose, as shown in FIG. 4, first, the tire T is mounted on the tire balance measurement device 1 (Step S101). Here, an inner peripheral edge portion t1 (refer to FIG. 1) on the lower surface side of the tire T is set on the lower rim 13 in a state where the upper rim 14 is lifted by the lifting/lowering device so as to be separated from the lower rim 13. Next, the upper rim 14 is lowered by the lifting/lowering device to come into close contact with an inner peripheral edge portion t2 (refer to FIG. 1) on the upper surface side of the tire T. Next, the tire T is filled with air by an air filling mechanism (not shown) included in the lower rim 13.

In this way, after the tire T is interposed between the lower rim 13 and the upper rim 14 so as to be held, the main shaft 12 is rotated around the center axis at a predetermined rotation speed by controlling the rotation drive portion 17 using the rotation control unit 21 (Step S102).

Accordingly, the tire T integrally rotates with the main shaft 12, the lower rim 13, the shaft 15, and the lower rim 13.

The load cells 16L and 16H detect an eccentric force generated in the main shaft 12 during the rotation of the tire T (Step S103). An output signal of the eccentric force detected by each of the load cells 16L and 16H is transmitted to the calculation unit 22 of the control unit 20.

The calculation unit 22 calculates the unbalance amount of the tire T based on the output signal transmitted from the load cells 16L and 16H (Step S104).

The evaluation unit 23 determines whether or not the unbalance amount of the tire T calculated by the calculation unit 22 is within a predetermined reference range (Step S105). The tire T of which the unbalance amount is within the reference range can be determined as a good item, and the tire T of which the unbalance amount is out of the reference range can be determined as a defective item.

In this way, after the calculation and the evaluation of the unbalance amount with respect to the tire T end, air is released from the tire T. Thereafter, the upper rim 14 is lifted so as to be separated from the lower rim 13, and the tire T is removed from the upper rim 14 (Step S106).

(Measurement Processing of Eccentric Amount of Main Shaft)

Figure 5:
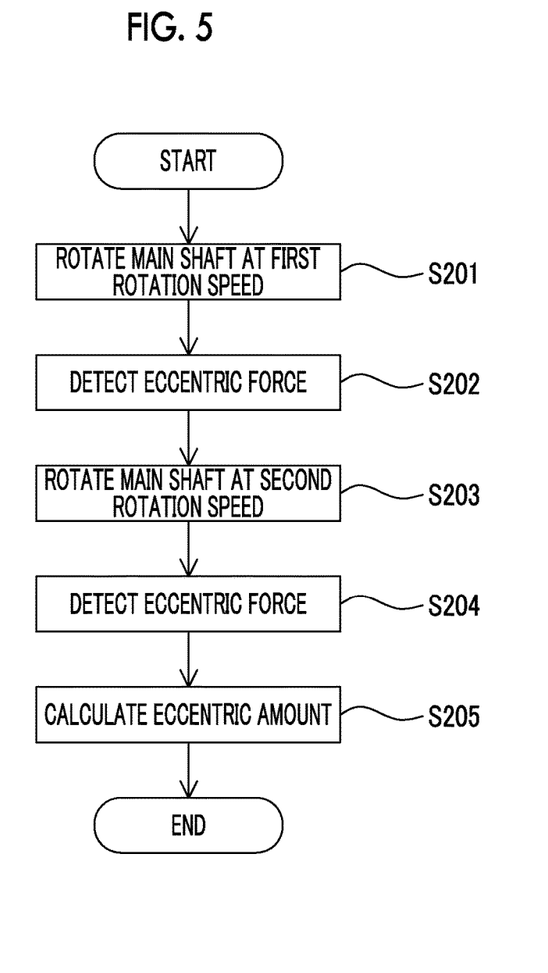
FIG. 5 is a flowchart showing a flow of measurement processing of an eccentric amount of the main shaft in the tire balance measurement device of the embodiment of the present invention.

FIG. 5 is a flowchart showing a flow of measurement processing of the eccentric amount of the main shaft in the tire balance measurement device of the embodiment of the present invention.

The tire balance measurement device 1 can measure the eccentric amount of the main shaft 12 in a state where the tire T is not mounted. In order to measure the eccentric amount of the main shaft 12, first, the upper rim 14 is lowered by the lifting/lowering device and is combined with the lower rim 13 in a state of being facing the lower rim 13.

Next, as shown in FIG. 5, the main shaft 12 is rotated around the center axis at a predetermined first rotation speed r1 by controlling the rotation drive portion 17 using the rotation control unit 21 (Step S201). Accordingly, the main shaft 12 rotates at the first rotation speed r1.

The load cells 16L and 16H detect the eccentric forces FL and FH generated in the main shaft 12 during the rotation thereof (Step S202). The output signals of the eccentric forces FL and FH detected by the load cells 16L and 16H are transmitted to the calculation units 22 of the control unit 20.

Next, the main shaft 12 is rotated around the center axis at a second rotation speed r2 different from the first rotation speed r1 by controlling the rotation drive portion 17 using the rotation control unit 21 (Step S203). Accordingly, the main shaft 12 rotates at the second rotation speed r2.

The load cells 16L and 16H detect the eccentric forces FL and FH generated in the main shaft 12 during the rotation thereof (Step S204). The output signals of the eccentric forces FL and FH detected by the load cells 16L and 16H are transmitted to the calculation units 22 of the control unit 20.

The calculation unit 22 calculates the eccentric amount of the main shaft 12 based on the output signals transmitted from the load cells 16L and 16H (Step S205).

Here, the method of calculating the unbalance amount of the tire T or the eccentric amount of the main shaft 12 by the calculation unit 22 based on the eccentric forces FL, FH, FL, and FH detected by the load cells 16L and 16H is not limited at all and can appropriately use a known calculation method.

For example, the calculation unit 22 obtains the unbalance amount (or the eccentric amount) P from the eccentric forces FL and FH detected by the load cells 16L and 16H when the tire T or the main shaft 12 is rotated, using Calculation Expression (1).

$$P = \begin{pmatrix} a & b \\ c & d \end{pmatrix} \times \begin{pmatrix} FL \\ FH \end{pmatrix} \qquad \text{[Expression 1]}$$

Here, a, b, c, and d are coefficients.

Next, an operation method of the above-described tire balance measurement device 1 will be described.

Figure 6:
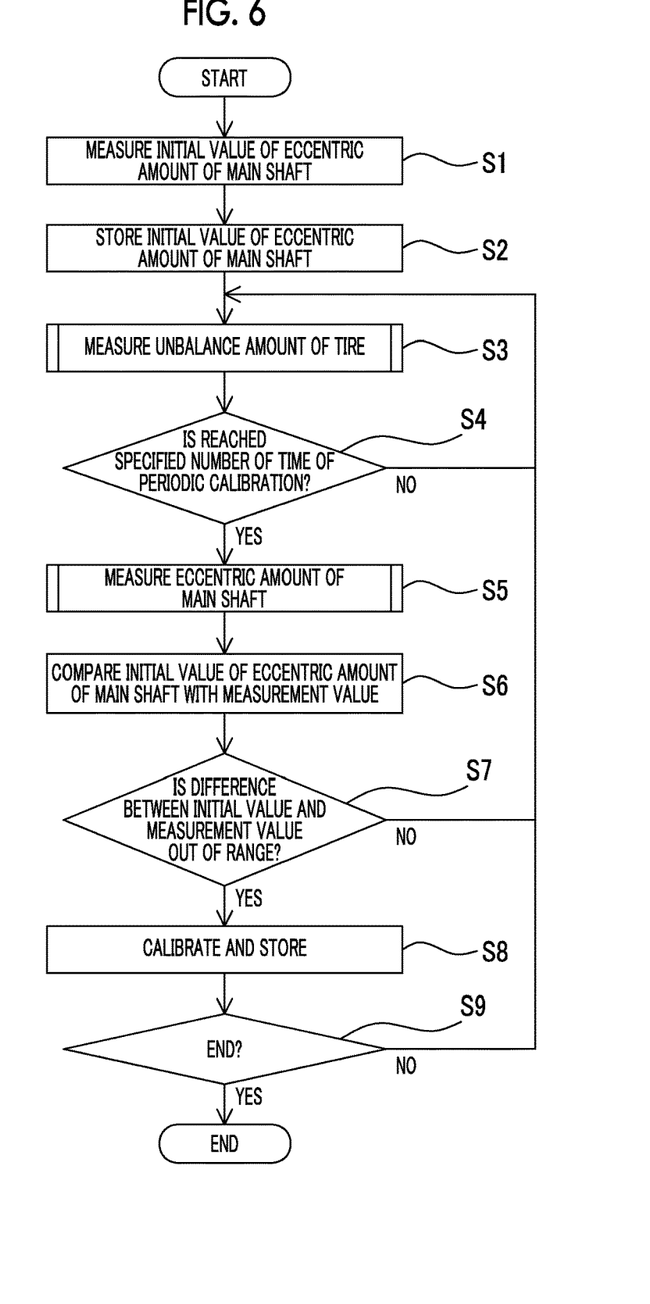
FIG. 6 is a flowchart showing a flow of an operation method in the tire balance measurement device of the embodiment of the present invention.

FIG. 6 is a flowchart showing a flow of the operation method in the tire balance measurement device of the embodiment of the present invention.

As shown in FIG. 6, after installation, the tire balance measurement device 1 measures an initial value of the eccentric amount of the main shaft 12 (Step S1). For this purpose, the measurement processing (Steps S201 to S205) of the eccentric amount of the main shaft 12 is performed. In this case, the eccentric amount P1 calculated from the eccentric forces FL and FH when the main shaft 12 is rotated at the first rotation speed r1 and the eccentric amount P2 calculated from the eccentric forces FL and FH when the main shaft 12 is rotated at the second rotation speed r2 are measured as initial values P1 and P2.

The initial values P1 and P2 of the eccentric amount of the main shaft 12 measured in Step S1 are stored in the storage unit 25 of the control unit 20 (Step S2).

Thereafter, the tire balance measurement device 1 measures the unbalance amount of the tire T which is sequentially transported from a manufacturing process (vulcanization process) of the tire to the tire balance measurement device 1 (Step S3). For this purpose, the measurement processing (Steps S101 to S106) of the unbalance amount of the tire T is performed.

In order to calibrate the tire balance measurement device 1 periodically, the control unit 20 determines whether or not the measurement process of the unbalance amount of the tire T is performed a predetermined and specified number of times (Step S4). In a case where the number of performances of the measurement process does not reach the specified number of times, the measurement process with respect to the unbalance amount of the tire T of Step S3 is repeated.

In a case where the number of performances of the measurement process reaches the specified number of times, the measurement of the eccentric amount of the main shaft 12 is performed (Step S5). In order to perform the measurement of the eccentric amount of the main shaft 12 in Step S5, the measurement processing (Step S201 to S205) of the eccentric amount of the main shaft 12 is performed.

In this case, a measurement value P1' of eccentric amounts obtained from eccentric forces FL' and FH' when the main shaft 12 is rotated at the first rotation speed r1 and a measurement value P2' of the eccentric amount obtained from eccentric forces FL' and FH' when the main shaft 12 is rotated at the second rotation speed r2 are stored in the storage unit 25.

Next, the evaluation unit 23 of the control unit 20 compares the measurement values P1' and P2' of the eccentric amount of the main shaft 12 with the initial values P1 and P2 of the eccentric amount of the main shaft 12 stored in the storage unit 25 in Step S2, based on the measurement result of the eccentric amount of the main shaft 12 measured in Step S5 (Step S6).

Here, in order to compare the eccentric amounts of the main shaft 12, specifically, it is performed as follows.

Figure 7:
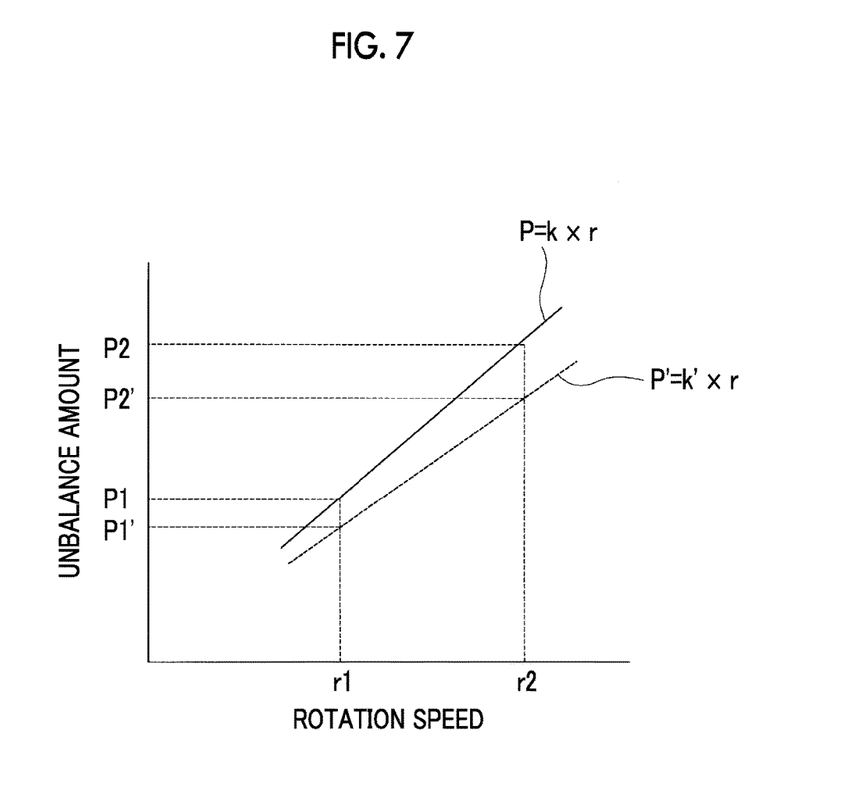
FIG. 7 is a view showing a correlation between a variation of a rotation speed and a variation of the eccentric amount of the main shaft used for calibrating the tire balance measurement device in the embodiment of the present invention.

FIG. 7 is a view showing a correlation between a variation of a rotation speed and a variation of the eccentric amount of the main shaft used for calibrating the tire balance measurement device in the embodiment of the present invention.

As shown in FIG. 7, for example, in the above-described Step S2, a relational expression P=k×r which indicates the correlation between the rotation speed r and the eccentric amount P of the main shaft 12 is determined from the initial value P1 of the eccentric amount when the main shaft 12 is rotated at the first rotation speed r1 and the initial value P2 of the eccentric amount when the main shaft 12 is rotated at the second rotation speed r2.

Moreover, in the above-described Step S5, a relational expression P'=k'×r which indicates the correlation between the rotation speed r and the eccentric amount P' of the main shaft 12 is determined from the measurement value P1' of the eccentric amounts obtained from the eccentric forces FL' and FH' when the main shaft 12 is rotated at the first rotation speed r1 and the measurement value P2' of the eccentric amounts obtained from the eccentric forces FL' and FH' when the main shaft 12 is rotated at the second rotation speed r2.

The evaluation unit 23 compares the coefficient k and the coefficient k' with each other by the relational expression P based on the initial values P1 and P2 stored in Step S2 and the relational expression P' based on the measurement values P1' and P2' measured in Step S5 (Step S7). If a difference (or magnification) of the coefficient k' with respect to the coefficient k is within a predetermined range, the step is returned to Step S3, and the measurement with respect to the unbalance amount of the tire T is continued.

In Step S7, in a case where the difference (or magnification) of the coefficient k' with respect to the coefficient k is out of the predetermined range, calibration processing is performed (Step S8).

For this purpose, a correction coefficient k" is obtained by "k"=k/k'" such that the current coefficient k' based on the measurement values P1' and P2' measured by Step S5 becomes the coefficient k based on the initial values P1 and P2 stored in Step S2.

The corrected correction coefficient k"(=k/k') is stored in the storage unit 25. Thereafter, in a case where the measurement of the unbalance amount of the tire T is performed, the unbalance amount P of the tire T is calculated from the eccentric forces FL and FH detected by the load cells 16L and 16H by correcting Calculation Expression (1) using the correction coefficient k"(=k/k').

The series of processing as described above is repeatedly performed until the measurement of the unbalance amount of the tire T in the tire balance measurement device 1 ends (Step S9).

In addition, the measurement processing and the storing processing of the initial value of the eccentric amount of the main shaft 12 in Steps S1 and S2 may be performed only when the tire balance measurement device 1 is installed, and thereafter, when the tire balance measurement device 1 is activated and the measurement of the unbalance amount of the tire T starts, the correction value stored in Step S9 may be used. Of course, each time the tire balance measurement device 1 is activated, the measurement processing and the storing processing of the initial value of the eccentric amount of the main shaft 12 in Steps S1 and S2 may be performed.

According to the tire balance measurement device 1 and the evaluation method of the tire balance measurement device 1 of the above-described embodiment, if the main shaft 12 is rotated by the rotation drive portion 17 in a state where the tire T is not interposed between the pair of lower rim 13 and upper rim 14 and the eccentric force F of the main shaft 12 is measured by the load cells 16L and 16H, it is possible to obtain the eccentric amount of the main shaft 12 itself by the calculation unit 22. For example, in a case where the eccentric amount of the main shaft 12 itself is changed due to some reasons including a change of temperatures or the like, if the main shaft 12 is rotated at the same rotation speed before and after the change of the eccentric amounts occurs, it is possible to easily ascertain the change.

Accordingly, in the evaluation unit 23, by evaluating the eccentric amount of the main shaft 12 based on the correlation between the eccentric amount calculated from the eccentric force F measured by the load cells 16L and 16H when the main shaft 12 is rotated at predetermined rotation speeds r1 and r2 by the rotation drive portion 17 and the rotation speeds r1 and r2, it is possible to ascertain whether or not the change of the eccentric amounts of the main shaft 12 is generated.

In this way, it is possible to ascertain the change of the eccentric amounts of the main shaft 12 itself without mounting a sinker on the main shaft 12. Accordingly, it is possible to check the eccentric amount of the main shaft 12 easily and in a short time.

Moreover, in a case where the eccentric amount of the main shaft 12 is changed, it is possible to calibrate the tire balance measurement device 1 by correcting Calculation Expression (1) which is used in the calculation by the calculation unit 22 using the calibration unit 24.

In this way, it is possible to check and calibrate the eccentric amount of the main shaft 12 in a short time even while measuring and evaluating the unbalance amount of the tire T continuously. As a result, the calibration of the tire balance measurement device 1 is easily performed, and it is possible to prevent production efficiency of the manufacturing process of the tire T from decreasing. In addition, since the check of the eccentric amount of the main shaft 12 can be easily performed in a short time, it is possible to check the eccentric amount of the main shaft 12 more frequently than the related art, and it is possible to perform quality control with higher accuracy.

Moreover, in the evaluation unit 23, if the main shaft 12 is rotated at the plurality of rotation speeds r1 and r2 different from each other and the eccentric force F is measured at each of the rotation speeds r1 and r2, it is possible to evaluate the change of the eccentric amounts of the main shaft 12 with higher accuracy.

Moreover, since the above-described calibration method of the tire balance measurement device 1 and the above-described calibration program of the tire balance measurement device 1 are introduced to the tire balance measurement device 1, it is possible to ascertain the change of the eccentric amounts of the main shaft 12 itself without mounting a sinker on the main shaft 12. Accordingly, it is possible to easily check the eccentric amount of the main shaft 12 in a short time.

Moreover, in a case where the eccentric amount of the main shaft 12 is changed, it is possible to calibrate the tire balance measurement device 1 by correcting Calculation Expression (1) which is used in the calculation by the calculation unit 22 using the calibration unit 24.

(Other Embodiments)

The present invention is not limited to the above-described embodiment, and design modifications can be applied to the present invention within a scope which does not depart from the gist of the present invention.

For example, in the above-described embodiment, when the eccentric amount of the main shaft 12 is measured, the main shaft 12 is rotated in the state where the upper rim 14 is lowered so as to face the lower rim 13. However, the present invention is not limited to this. For example, only the main shaft 12 and the lower rim 13 may be integrally rotated with each other to measure the eccentric amount of the main shaft 12.

In addition, in the above-described embodiment, when the number of measurements with respect to the unbalance amount of the tire T reaches the specified number of times, the eccentric amount of the main shaft 12 is measured. However, the eccentric amount of the main shaft 12 may be checked at any timing as long as the main shaft 12 is rotated and the eccentric force F can be detected. For example, the eccentric amount of the main shaft 12 may be measured when the measurement period of the unbalance amount of the tire T has reached a predetermined specified period.

In addition, in the above-described embodiment, the eccentric force F of the main shaft 12 on the lower rim 13 side is detected by the load cells 16L and 16H. However, the main shaft 12 may be provided on the upper rim 14 side to measure the eccentric force F by the main shaft 12 on the upper rim 14 side.

In the above-described embodiment, the tire balance measurement device 1 is calibrated by measuring the eccentric force F at the first rotation speed r1 and the second rotation speed r2. However, the eccentric force F may be measured at three or more rotation speeds different from each other.

Moreover, the calibration of the tire balance measurement device 1 is realized by correcting Calculation Expression (1) used in the calculation of the unbalance amount in the calculation unit 22. However, Calculation Expression or the correction contents are not limited at all.

When the initial value of the eccentric amount of the main shaft 12 is measured after the tire balance measurement device 1 is installed, the measurement processing (Step S201 to S205) of the eccentric amount of the main shaft 12 is performed. However, the present invention is not limited to this. When the initial value of the eccentric amount of the main shaft 12 is measured after the tire balance measurement device 1 is installed, the initial value the eccentric amount of the main shaft 12 may be measured in a state where the tire T or the sinker is attached.

The structure of the tire balance measurement device is not limited at all and may have any other configuration. For example, the tire balance measurement device 1 is a vertical type configuration in which the lower rim 13 and the upper rim 14 vertically face each other and the main shaft 12 extends in the vertical direction. However, the present invention can be similarly applied to a horizontal type configuration in which a pair of rims faces to each other in a horizontal direction.

The evaluation method and the correction method of the tire balance measurement device 1 described in the above-described embodiment are realized by introducing a computer program to the control unit 20 of the tire balance measurement device 1. Accordingly, the present invention can be configured as the calibration program of the tire balance measurement device 1.

INDUSTRIAL APPLICABILITY

By evaluating the eccentric amount of the main shaft based on the correlation between the eccentric force measured when the main shaft is rotated at a predetermined rotation speed and the rotation speed, the tire balance measurement device is easily calibrated, a decrease in the production efficiency of the manufacturing process of the tire is prevented, and it is possible to perform quality control with higher accuracy.

REFERENCE SIGNS LIST

1: tire balance measurement device
10: device main body
11: base
11a: upper surface
12: main shaft
12a: upper end portion
12h: insertion hole
13: lower rim
13f: rim contact surface
14: upper rim
14f: rim contact surface
14p: held portion
15: shaft
15b: lower end portion
16H, 16L: load cell (eccentric force measurement unit)
17: rotation drive portion
18: chuck member
19: main shaft support member
19h: attachment member
19r: outer peripheral surface
20: control unit
21: rotation control unit
22: calculation unit
23: evaluation unit
24: calibration unit (correction unit)
25: storage unit
FL, FL': eccentric force
T: tire
t1, t2: inner peripheral edge portion

The invention claimed is:

1. A tire balance measurement device, comprising:
a rotation drive portion which rotates a main shaft which supports at least one of a pair of rims;
an eccentric force measurement unit which measures an eccentric force generated in the main shaft when the main shaft is rotated;
a calculation unit which calculates an eccentric amount of the main shaft based on the eccentric force measured by the eccentric force measurement unit; and
an evaluation unit which evaluates the eccentric amount of the main shaft, on which no tire is interposed, based on a correlation between the eccentric force calculated by the calculation unit based on the eccentric force measured when the main shaft is rotated at a predetermined rotation speed by the rotation drive portion, and the rotation speed.

2. The tire balance measurement device according to claim 1, further comprising:
a correction unit which corrects Calculation Expression used in a calculation by the calculation unit based on an evaluation result of the eccentric amount by the evaluation unit.

3. The tire balance measurement device according to claim 1,
wherein the evaluation unit evaluates the eccentric amount of the main shaft based on a correlation between the eccentric amount calculated by the calculation unit based on the eccentric force measured when the main shaft is rotated at each rotation speed by rotating the main shaft at a plurality of rotation speeds different from each other, and the rotation speed.

4. An evaluation method of a tire balance measurement device including
   a pair of rims,
   a rotation drive portion which rotates the pair of rims,
   an eccentric force measurement unit which measures an eccentric force generated in a main shaft when the main shaft which supports at least one of the pair of rims is rotated, and
   a calculation unit which calculates an eccentric amount of the main shaft based on the eccentric force measured by the eccentric force measurement unit,
   the method comprising:
   a step of evaluating the eccentric amount of the main shaft, on which no tire is interposed, based on a correlation between the eccentric amount calculated by the calculation unit based on the eccentric force measured when the main shaft is rotated at a predetermined rotation speed by the rotation drive portion, and the rotation speed.

5. A calibration method of a tire balance measurement device including
   a pair of rims,
   a rotation drive portion which rotates the pair of rims,
   an eccentric force measurement unit which measures an eccentric force generated in a main shaft when the main shaft which supports at least one of the pair of rims is rotated, and
   a calculation unit which calculates an eccentric amount of the main shaft based on the eccentric force measured by the eccentric force measurement unit,
   the method comprising:
   a step of evaluating the eccentric amount of the main shaft, on which no tire is interposed, based on a correlation between the eccentric amount calculated by the calculation unit based on the eccentric force measured when the main shaft is rotated at a predetermined rotation speed by the rotation drive portion, and the rotation speed; and
   a step of correcting Calculation Expression used in a calculation by the calculation unit based on an evaluation result of the eccentric amount by the step of evaluating the eccentric amount of the main shaft.

6. A calibration program of a tire balance measurement device including
   a pair of rims,
   a rotation drive portion which rotates the pair of rims,
   an eccentric force measurement unit which measures an eccentric force generated in a main shaft when the main shaft which supports at least one of the pair of rims is rotated, and
   a calculation unit which calculates an eccentric amount of the main shaft based on the eccentric force measured by the eccentric force measurement unit,
   the program comprising:
   processing of evaluating the eccentric amount of the main shaft, on which no tire is interposed, based on a correlation between the eccentric amount calculated by the calculation unit based on the eccentric force measured when the main shaft is rotated at a predetermined rotation speed by the rotation drive portion, and the rotation speed; and
   processing of correcting Calculation Expression used in a calculation by the calculation unit based on an evaluation result of the eccentric amount by the processing of evaluating the eccentric amount of the main shaft.

* * * * *